(12) United States Patent
Srinivasan et al.

(10) Patent No.: US 8,942,289 B2
(45) Date of Patent: Jan. 27, 2015

(54) COMPUTATIONAL COMPLEXITY AND PRECISION CONTROL IN TRANSFORM-BASED DIGITAL MEDIA CODEC

(75) Inventors: Sridhar Srinivasan, Redmond, WA (US); Chengjie Tu, Sammamish, WA (US); Shankar Regunathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1371 days.

(21) Appl. No.: 11/772,076

(22) Filed: Jun. 29, 2007

(65) Prior Publication Data
US 2008/0198935 A1    Aug. 21, 2008

Related U.S. Application Data

(60) Provisional application No. 60/891,031, filed on Feb. 21, 2007.

(51) Int. Cl.
| | |
|---|---|
| *H04N 11/02* | (2006.01) |
| *H04N 21/6547* | (2011.01) |
| *H04N 19/122* | (2014.01) |
| *H04N 19/60* | (2014.01) |
| *H04N 19/156* | (2014.01) |
| *H04N 19/46* | (2014.01) |

(52) U.S. Cl.
CPC ..... *H04N 21/6547* (2013.01); *H04N 19/00084* (2013.01); *H04N 19/00775* (2013.01); *H04N 19/00206* (2013.01); *H04N 19/00545* (2013.01)
USPC ................. 375/240.18; 375/E7.001

(58) Field of Classification Search
None
See application file for complete search history.

(56) References Cited

U.S. PATENT DOCUMENTS

| | | | |
|---|---|---|---|
| 4,922,537 | A | 5/1990 | Frederiksen |
| 5,168,375 | A | 12/1992 | Reisch et al. |
| 5,325,215 | A | 6/1994 | Shibata et al. |
| 5,357,594 | A | 10/1994 | Fielder |
| 5,379,351 | A | 1/1995 | Fandrianto et al. |
| 5,394,349 | A | 2/1995 | Eddy |
| 5,416,604 | A | 5/1995 | Park |
| 5,430,556 | A | 7/1995 | Ito et al. |

(Continued)

FOREIGN PATENT DOCUMENTS

| | | |
|---|---|---|
| CA | 2452343 | 1/2002 |
| CN | 1452396 | 10/2003 |

(Continued)

OTHER PUBLICATIONS

Official Notice of Final Rejection dated Apr. 21, 2009, from Japanese Patent Application No. 2006-279187, 3 pp.

(Continued)

*Primary Examiner* — Christopher Revak
(74) *Attorney, Agent, or Firm* — Micah Goldsmith; Judy Yee; Micky Minhas

(57) ABSTRACT

A digital media encoder/decoder includes signaling of various modes relating to computation complexity and precision at decoding. The encoder may send a syntax element indicating arithmetic precision (e.g., using 16 or 32-bit operations) of the transform operations performed at decoding. The encoder also may signal whether to apply scaling at the decoder output, which permits a wider dynamic range of intermediate data at decoding, but adds to computational complexity due to the scaling operation.

30 Claims, 5 Drawing Sheets

(56) References Cited

U.S. PATENT DOCUMENTS

| | | | |
|---|---|---|---|
| 5,559,557 A | 9/1996 | Kato | |
| 5,587,708 A * | 12/1996 | Chiu | 341/76 |
| 5,590,066 A | 12/1996 | Ohki | |
| 5,768,167 A | 6/1998 | Kuroda | |
| 5,790,441 A | 8/1998 | Oami et al. | |
| 5,844,609 A | 12/1998 | Filor et al. | |
| 5,864,637 A | 1/1999 | Liu et al. | |
| 5,970,173 A | 10/1999 | Lee et al. | |
| 5,974,184 A | 10/1999 | Eifrig et al. | |
| 5,995,539 A | 11/1999 | Miller | |
| 5,999,657 A | 12/1999 | Yasuhiko | |
| 6,002,801 A | 12/1999 | Strongin et al. | |
| 6,006,179 A | 12/1999 | Wu et al. | |
| 6,029,126 A | 2/2000 | Malvar | |
| 6,057,855 A | 5/2000 | Barkans | |
| 6,058,215 A | 5/2000 | Schwartz et al. | |
| 6,073,153 A | 6/2000 | Malvar | |
| 6,085,221 A * | 7/2000 | Graf | 709/202 |
| 6,115,689 A | 9/2000 | Malvar | |
| 6,124,995 A | 9/2000 | Kim | |
| 6,137,916 A | 10/2000 | Chang et al. | |
| 6,154,762 A | 11/2000 | Malvar | |
| 6,301,304 B1 | 10/2001 | Jing et al. | |
| 6,324,560 B1 | 11/2001 | Malvar | |
| 6,356,870 B1 | 3/2002 | Hui et al. | |
| 6,363,117 B1 | 3/2002 | Kok | |
| 6,370,502 B1 | 4/2002 | Wu et al. | |
| 6,389,071 B1 | 5/2002 | Wilson | |
| 6,421,464 B1 | 7/2002 | Tran et al. | |
| 6,473,534 B1 | 10/2002 | Merhav et al. | |
| 6,487,574 B1 | 11/2002 | Malvar | |
| 6,496,795 B1 | 12/2002 | Malvar | |
| 6,507,614 B1 | 1/2003 | Li | |
| 6,574,651 B1 | 6/2003 | Cui et al. | |
| 6,600,785 B1 | 7/2003 | Nishigori et al. | |
| 6,606,725 B1 | 8/2003 | Wang et al. | |
| 6,643,408 B2 | 11/2003 | Kobayashi | |
| 6,687,726 B1 | 2/2004 | Schneider | |
| 6,694,342 B1 | 2/2004 | Mou | |
| 6,701,019 B1 | 3/2004 | Wu et al. | |
| 6,728,317 B1 | 4/2004 | Demos | |
| 6,831,951 B2 | 12/2004 | Yamada | |
| 6,882,685 B2 | 4/2005 | Malvar | |
| 6,944,224 B2 | 9/2005 | Zhao et al. | |
| 6,970,479 B2 * | 11/2005 | Abrahamsson et al. | 370/477 |
| 7,028,063 B1 | 4/2006 | Sarmaru et al. | |
| 7,075,530 B2 | 7/2006 | D'Amora | |
| 7,106,797 B2 | 9/2006 | Malvar | |
| 7,117,053 B1 | 10/2006 | Absar et al. | |
| 7,123,655 B2 | 10/2006 | Kerofsky | |
| 7,194,138 B1 | 3/2007 | Bright et al. | |
| 7,197,525 B2 | 3/2007 | Stein et al. | |
| RE40,081 E | 2/2008 | Tran et al. | |
| 7,379,498 B2 * | 5/2008 | Fu et al. | 375/240.12 |
| 7,492,950 B2 | 2/2009 | Suzuki et al. | |
| 7,499,495 B2 * | 3/2009 | Srinivasan | 375/240.16 |
| 7,502,415 B2 * | 3/2009 | Lin et al. | 375/240.18 |
| 7,555,167 B2 * | 6/2009 | Srinivasan et al. | 382/239 |
| 7,688,895 B2 * | 3/2010 | Winger et al. | 375/240.25 |
| 2002/0013703 A1 | 1/2002 | Matsumoto et al. | |
| 2002/0044602 A1 * | 4/2002 | Ohki | 375/240.03 |
| 2002/0154693 A1 | 10/2002 | Demos et al. | |
| 2003/0006916 A1 | 1/2003 | Yakamizawa | |
| 2003/0058940 A1 | 3/2003 | Klein Gunnewiek et al. | |
| 2003/0093452 A1 | 5/2003 | Zhou | |
| 2003/0147463 A1 | 8/2003 | Sato et al. | |
| 2005/0004964 A1 | 1/2005 | Luo | |
| 2005/0013365 A1 | 1/2005 | Mukerjee et al. | |
| 2005/0018774 A1 | 1/2005 | Winger et al. | |
| 2005/0063471 A1 | 3/2005 | Regunathan et al. | |
| 2005/0094726 A1 | 5/2005 | Park | |
| 2005/0213659 A1 | 9/2005 | Malvar | |
| 2005/0213835 A1 | 9/2005 | Guangxi et al. | |
| 2005/0238096 A1 * | 10/2005 | Holcomb et al. | 375/240.03 |
| 2005/0259729 A1 | 11/2005 | Sun | |
| 2006/0133481 A1 | 6/2006 | Chujoh | |
| 2007/0027677 A1 | 2/2007 | Ouyang et al. | |
| 2007/0196025 A1 | 8/2007 | Tran et al. | |
| 2007/0271321 A1 | 11/2007 | Reznik et al. | |
| 2008/0198935 A1 * | 8/2008 | Srinivasan et al. | 375/240.23 |
| 2009/0034856 A1 | 2/2009 | Moriya et al. | |
| 2010/0150394 A1 * | 6/2010 | Bloom et al. | 382/100 |
| 2010/0169349 A1 * | 7/2010 | Zou et al. | 707/758 |
| 2012/0014431 A1 * | 1/2012 | Zhao et al. | 375/240.02 |
| 2012/0082218 A1 * | 4/2012 | Misra et al. | 375/240.12 |

FOREIGN PATENT DOCUMENTS

| | | |
|---|---|---|
| DE | 4133460 | 4/1993 |
| EP | 854653 | 7/1998 |
| EP | 1359546 | 11/2003 |
| JP | 63-219066 | 9/1988 |
| JP | 04-282988 | 10/1992 |
| JP | 06-045948 | 2/1994 |
| JP | 06-045949 | 2/1994 |
| JP | 06-054307 | 2/1994 |
| JP | 06-105296 | 4/1994 |
| JP | 06-165155 | 6/1994 |
| JP | 09-008665 | 1/1997 |
| JP | 10-091614 | 4/1998 |
| JP | 11-284861 | 10/1999 |
| JP | 2001-292450 | 10/2001 |
| JP | 2003-333598 | 11/2003 |
| JP | 2003-348598 | 12/2003 |
| JP | 2006-005478 | 1/2006 |
| JP | 3964765 | 8/2007 |
| JP | 3964925 | 8/2007 |
| KR | 10-2003-0019787 | 3/2003 |
| KR | 10-2005-0034889 | 4/2005 |
| RU | 2201654 | 3/2003 |
| RU | 2005107478 | 7/2006 |
| WO | WO 0140985 | 6/2001 |
| WO | WO 2005/076614 | 8/2005 |
| WO | WO 2006/113019 | 10/2006 |
| WO | WO 2007/010690 | 1/2007 |

OTHER PUBLICATIONS

Official Notice of Final Rejection dated Apr. 21, 2009, from Japanese Patent Application No. 2006-279189, 3 pp.
Official Notice of Final Rejection dated Apr. 21, 2009, from Japanese Patent Application No. 2006-322322, 3 pp.
"B.H.A. Corporation Introduces The XVD™ Media Platform," Press Release dated Apr. 24, 2003, 2 pages.
Goldston, "Comparing Media Codecs for Video Content," *Embedded Systems Conference*, 2004, 18 pages.
Johanson, "SIRAM—Scalable Internet Real-time Media Project Report," undated, 11 pages.
Loomis et al., "VC-1 Technical Overview," Apr. 2006, 5 pages.
Gao et al., "Bit Depth Scalability," Joint Video Team (JVT) of ISO/IEC MPEG & ITU-T VCEG, JVT-V061, 11 pp. (Jan. 2007).
Notice on the First Office Action dated Dec. 6, 2010, from Chinese Patent Application No. 200880005630.0 (with English translation), 6 pp.
Official Action dated Jul. 20, 2011, for Russian Patent Application No. 2009131599, 4 pp.
Winken et al., "SVC bit depth scalability," Joint Video Team (JVT) of ISO/IEC MPEG & ITU-T VCEG, JVT-V078, 17 pp. (Jan. 2007).
International Search Report and Written Opinion for PCT/US2008/054473, dated Aug. 14, 2008, 10 pages.
Adams et al., "Design of Reversible Subband Transforms Using Lifting," IEEE, pp. 489-492 (Aug. 1997).
Bruekers et al., "New Networks for Perfect Inversion and Perfect Reconstruction," *IEEE Journal on Selected Areas in Communications*, vol. 10, No. 1, pp. 130-137 (Jan. 1992).
Calderbank et al., "Lossless Image Compression Using Integer to Integer Wavelet Transforms," *IEEE*, 4 pp. (Oct. 1997).
Chan, "The Generalized Lapped Transform (GLT) for Subband Coding Applications," IEEE, pp. 1508-1511 (May 1995).
Fujiwara, "The Latest MPEG Textbook," pp. 146-147 (1994).

(56) References Cited

OTHER PUBLICATIONS

Ikehara et al., "Generalized Lapped Biorthogonal Transforms with Integer Coefficients," *IEEE*, pp. 886-890 (Oct. 1998).
Karp et al., "Biorthogonal Cosine-Modulated Filter Banks Without DC Leakage," *IEEE*, pp. 1457-1460 (May 1998).
Karp et al., "Efficient Prototype Filter Realizations for Cosine-Modulated Filter Banks," *Seizieme Colloque Gretsi*, pp. 551-554 (Sep. 1997).
Karp et al., "Lifting Schemes for Biorthogonal Modulated Filter Banks," *IEEE*, pp. 443-446 (Jul. 1997).
Malvar, "Biorthogonal and Nonuniform Lapped Transforms for Transform Coding with Reduced Blocking and Ringing Artifacts," IEEE, 29 pp. (Oct. 20, 1997).
Malvar, "Lapped Biorthogonal Transforms for Transform Codingwith Reduced Blocking and Ringing Artifacts," IEEE, 4 pp. (Apr. 1997).
Malvar, *Signal Processing with Lapped Transforms*, Chapter 5, "Modulated Lapped Transforms," pp. 175-218 (Jan. 1992).
Malvar et al., "The LOT: Transform Coding Without Blocking Effects," *IEEE Transactions on Acoustics, Speech, and Signal Processing*, vol. 37, No. 4, pp. 553-559 (Apr. 1989).
Nguyen et al., "Structures for M-Channel Perfect-Reconstruction FIR QMF Banks Which Yield Linear-Phase Analysis Filters," IEEE Transactions on Acoustics, Speech, and Signal Processing, vol. 38, No. 3, pp. 433-446 (Mar. 1990).
Oraintara et al., "Integer Fast Fourier Transform," IEEE Trans. on Signal Processing, vol. 50, No. 3, pp. 607-618 (Mar. 2002).
Sweldens, "The Lifting Scheme: A Custom-Design Construction of Biorthogonal Wavelets," 29 pp. (Nov. 1994).
Tian et al., "Dyadic Rational Biorthogonal Coifman Wavelet Systems," Technical Report CML TR 96-07, 50 pp. (Feb. 27, 1996).
Topiwala, "FastVDO Unified 16-Bit Framework," FastVDO LLC Powerpoint Presentation, 26 pp. (Jan. 2002).
Tran et al., "The Generalized Lapped Biorthogonal Transform," *IEEE*, pp. 1441-1444 (May 1998).
Tran, "The LIFTLT: Fast Lapped Transforms Via Lifting Steps," *IEEE*, vol. 2, pp. 745-748 (Oct. 1999).
Tran, "The LIFTLT: Fast Lapped Transforms via Lifting Steps," *IEEE Transactions on Signal Processing Letters*, vol. 7, Issue 6, pp. 145-148 (Jun. 2000).
Notice of Rejection dated May 11, 2012, from Japanese Patent Application No. 2009-550994, 18 pp.
Notice on the Second Office Action dated Mar. 12, 2012, from Chinese Patent Application No. 200880005630.0, 7 pp.
Official Action dated Mar. 5, 2012, from Russian Patent Application No. 2009131599, 4 pp. (no English translation available).
Final Decision of Rejection dated Jul. 10, 2013, from Japanese Patent Application No. 2009-550994, 7 pp.
U.S. Appl. No. 60/341,674, filed Dec. 2001, Lee et al.
U.S. Appl. No. 60/488,710, filed Jul. 2003, Srinivasan et al.
U.S. Appl. No. 60/501,081, filed Sep. 2003, Srinivasan et al.
U.S. Appl. No. 60/501,133, filed Sep. 2003, Holcomb et al.
Arai et al., "A Fast DCT-SQ Scheme for Images," The Transactions of the IEICE, vol. E-71, No. 11, pp. 1095-1097 (Nov. 1988).
Bjontegaard, "H.26L Test Model Long Term No. 8 (TML-8) Draft 0," *Video Coding Experts Group(VCEG)*, pp. 1-46.
Calderbank et al., "Wavelet Transforms that Map Integers to Integers," pp. 1-39 (Aug. 1996).
Cham, "Development of Integer Cosine Transforms by the Principle of Dyadic Symmetry," *IEE Proceedings*, vol. 136, Pt. 1, No. 4, pp. 276-282 (Aug. 1989).
Chen et al., "A fast computational algorithm for the discrete cosine transform," *IEEE Trans. Commun.*, vol. 25, pp. 1004-1009 (Sep. 1977).
Cooley et al., "An Algorithm for the Machine Calculation of Complex Fourier Series," *Math Computation*, vol. 19, pp. 297-301 (1965).
Hohl, "An 8×8 Discrete Cosine Transform Implementation on the TMS320C25 or the TMS320C30," *Texas Instruments Application Report SPRA115*, pp. 1-25 (1990) http://focus.ti.com/lit/an/spra115/spra115.pdf[Downloaded from the World Wide Web on Dec. 28, 2005].
Ishii et al., "Parallel Variable Length Decoding with Inverse Quantization for Software MPEG-2 Decoders," *IEEE Signal Processing Systems*, pp. 500-509 (1997).
ISO/IEC, "ISO/IEC 11172-2, Information technology—Coding of moving pictures and associated audio for digital storage media at up to about 1,5 Mbit/s—Part 2: Video," 112 pp. (1993).
ISO/IEC, "JTC1/SC29/WG11 N2202, Information Technology—Coding of Audio-Visual Objects: Visual, ISO/IEC 14496-2," 329 pp. (1998).
ITU-T, "ITU-T Recommendation H.261, Video Codec for Audiovisual Services at p×64 kbits," 25 pp. (1993).
ITU-T, "ITU-T Recommendation H.262, Information Technology—Generic Coding of Moving Pictures and Associated Audio Information: Video," 205 pp. (1995).
ITU-T, "ITU-T Recommendation H.263, Video coding for low bit rate communicatgion," 162 pp. (1998).
Jeong et al., "A Fast Algorithm Suitable for DCT Implementation with Integer Multiplication," *IEEE TENCON*, vol. 2, pp. 784-787 (1996).
Joint Video Team of ISO/IEC MPEG and ITU-T VCEG, "Final Joint Committee Draft of Joint Video Specification (ITU-T Recommendation H.264, ISO/IEC 14496-10 AVC)," 206 pp. (Aug. 2002).
Li et al., "On Implementing Transforms from Integers to Integers," Department of Electrical Engineering, Princeton University, pp. 881-885 (Jun. 1998).
Liang et al., "A 16-bit Architecture for H.26L, Treating DCT Transforms and Quantization," *Thirteenth Meeting*: Austin, Texas, pp. 1-17 (Apr. 2001).
Liang et al., "Approximating the DCT with the Lifting Scheme: Systematic Design and Applications," *IEEE Conference Record of the 34th Asilomar Conference*, vol. 1, pp. 192-196 (Oct. 2000).
Liang et al., "Fast Multiplierless Approximation of the DCT with the Lifting Scheme," *Proc. SPIE Apps. ff Digital Image Processing XXIII*, 12 pp. (Aug. 2000).
Loeffler et al., "Practical fast 1-D DCT algorithms with 11 multiplications," *Proc. IEEE ICASSP*, vol. 2, pp. 988-991 (Feb. 1989).
Malvar, "Fast Computation of the Discrete Cosine Transform and the Discrete Hartley Transform," *IEEE Trans. Acoust., Speech., Signal Processing*, vol. ASSP-35, pp. 1484-1485 (Oct. 1987).
Malvar, "Low-complexity Length-4 Transform and Quantization with 16-bit Arithmetic," *Proposal, ITU Study Group 16 Question 6 Video Coding Experts Group*, 24 pp., 14th Meeting held Sep. 24-27, 2001, Santa Barbara, CA.
Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].
Mook, "Next-Gen Windows Media Player Leaks to the Web," *BetaNews*, 18 pp. (Jul. 19, 2002) [Dowloaded from the World Wide Web on Mar. 16, 2004].
Pei et al., "The Integer Transforms Analogous to Discrete Trigonometric Transforms," *IEEE Transactions on Signal Processing*, vol. 48, No. 12, pp. 3345-3364 (Dec. 2000).
Printouts of FTP directories from http://ftp3.itu.ch, 8 pp. (Downloaded from the World Wide Web on Sep. 20, 2005).
Reader, "History of MPEG Video Compression—Ver. 4.0," 99 pp. (Document marked Dec. 16, 2003).
Rubino et al., "Improved Chen-Smith Image Coder," Electrical Engineering Department, University of Texas at Arlington, pp. 267-270 (1993).
Shao, "Implementing JPEG with TMS320C2xx Assembly Language Software," *Texas Instruments Application Report SPRA615*, pp. 1-48 (Jan. 2000) http://focus.ti.com/lit/an/spra615/spra615.pdf [Downloaded from the World Wide Web on Dec. 28, 2005].
Sriram et al., "MPEG-2 Video decoding on the TMS320C6X DDP Architecture," *IEEE Conference Record on the 32nd Asilomar Conference*, vol. 2, pp. 1735-1739 (1998).
Sullivan et al., "The H.264/AVC Advanced Video Coding Standard: Overview and Introduction to the Fidelity Range Extensions," 21 pp. (Aug. 2004).

(56) References Cited

OTHER PUBLICATIONS

Tran, "The BinDCT: Fast Multiplierless Approximation of the DCT," *IEEE Signal Processing Letters*, vol. 7, No. 6, pp. 141-144 (Jun. 2000).
Wien, "Variable Block-Size Transforms for Hybrid Video Coding," Dissertation, 182 pp. (Feb. 2004).
Hallapuro et al., "Low complexity (I) DCT," VCEG-N43r3, 11 pp. (Sep. 2001).
Hallapuro et al., "Low complexity (I) DCT," VCEG-O25, 11 pp. (Dec. 2001).
Hallapuro et al., "Low Complexity Transform and Quantization-Part I: Basic Implementation," JVT-B038, 18 pp. (Jan. 2002).
Hallapuro et al., "Low Complexity Transform and Quantization-Part II: Extensions," JVT-B039, 15 pp. (Jan. 2002).
Kadono et al., "Proposal of Improved 2D-VLC coding for High-Bitrate," JVT-B056, 11 pp. (Jan. 2002).
Kerofsky, "AHG Report: Transform and Quantization," JVT-B008, 4 pp. (Jan. 2002).
Kerofsky, "Core experiment on reduced complexity transform and quantization," VCEG-N78r1, 3 pp. (Sep. 2001).
Kerofsky, H.26L Transform/quantization complexity reduction Ad Hoc Report, VCEG-O09, 4 pp. (Dec. 2001).
Kerofsky et al., "Reduced bit-depth quantization," VCEG-N020, 14 pp. (Sep. 2001).
Kerofsky, "Requirements for reduced complexity inverse transform and dequantization," VCEG-N69, 3 pp. (Sep. 2001).
Liang et al., "Fast Integer Transform and 16-bit architecture for H.26L," VCEG-N24r1, 18 pp. (Sep. 2001).
Liang et al., "FastVDO's Unified 16-Bit Transform/Quantization Approach," JVT-B103d1, 7 pp. (Jan. 2002).
Malvar, "Low-Complexity Length-4 Transform and Quantization with 16-Bit Arithmetic," VCEG-N44, 25 pp. (Sep. 2001).
Notice on Grant of Patent dated Oct. 10, 2012, from Chinese Patent Application No. 200880005630.0, 4 pp.
Notice of Final Reason for Rejection dated Dec. 11, 2012, from Japanese Patent Application No. 2009-550994, 14 pp.
Sullivan et al., "JVT (of ISO/IEC MPEG and ITU-T Q.6/16 VCEG) 2nd Meeting Report," JVT-B001, 51 pp. (Jan. 2002).
Suzuki et al., "Quantization Tools for High Quality Video," JVT-B067, 10 pp. (Jan. 2002).
Yamada et al., "Improved transform coding for inter-frame," JVT-B051, 8 pp. (Jan. 2002).
Zhou, "16-Bit Based Transform and Quantization," JVT-B031, 10 pp. (Jan. 2002).
Zhou, "16 bit integer transform and quantization," VCEG-N022, 13 pp. (Sep. 2001).
Supplementary European Search Report dated Feb. 5, 2013, from European Patent Application No. 08730305.3, 4 pp.
Suzuki et al., "New Quantization Tools," ISO/IEC MPEG2001/7737, 12 pp. (Dec. 2001).
Communication pursuant to Article 94(3) EPC dated Oct. 24, 2013, from European Patent Application No. 08730305.3, 5 pp.
Decision on Grant of a Patent dated Nov. 28, 2013, from Russian Patent Application No. 2009131599, 22 pp.
Search Report dated Sep. 12, 2013, from Taiwanese Patent Application No. 097105190, 1 p.
Diefendorff et al., "AltiVec Extension to PowerPC Accelerates Media Processing," *IEEE*, pp. 85-96 (Mar.-Apr. 2000).
Notification of Defects dated Nov. 7, 2012, from Israeli Patent Application No. 199994, 6 pp.
Fan et al., "Efficient Fast 1-D 8×8 Inverse Integer Transform for VC-1 Application," *IEEE Trans. On Circuits and Systems for Video Technology*, vol. 19, No. 4, 8 pp. (Apr. 2009).
Liang et al., "Fast Multiplierless Approximations of the DCT With the Lifting Scheme," *IEEE Trans on Signal Processing*, vol. 49, No. 12, pp. 3032-3044 (Dec. 2001).
Malvar et al., "Low-Complexity Transform and Quantization in H.264/AVC," *IEEE Trans. On Circuits and Systems for Video Technology*, vol. 13, No. 7, pp. 598-603 (Jul. 2003).
Malvar et al., "Transform, Scaling & Color Space Impact of Professional Extension," JVT-H031, 7 pp. (May 2003).
Notice of Allowance dated Dec. 11, 2013 from Japanese Patent Application No. 2009-550994, 5 pp.
Notice of Final Rejection dated Aug. 6, 2014, from Korean Patent Application No. 10-2009-7017002, 10 pp.
Notice of Preliminary Rejection dated Feb. 3, 2014, from Korean Patent Application No. 10-2009-7017002, 8 pp.
Srinivasan et al., "Computationally Efficient Transforms for Video Coding," *IEEE Int'l Conf. on Image Processing*, pp. II-325-II-328 (Sep. 2005).
Srinivasan et al., "Windows Media Video 9: overview and applications," *Signal Processing: Image Communication*, vol. 19, pp. 851-875 (Jul. 2004).

\* cited by examiner

Software 680 Implementing Digital Media Codec

COMPUTATIONAL COMPLEXITY AND PRECISION CONTROL IN TRANSFORM-BASED DIGITAL MEDIA CODEC

CROSS REFERENCE TO RELATED APPLICATION

This application claims the benefit of U.S. Provisional 60/891,031, filed Feb. 21, 2007 and is incorporated herein by reference.

BACKGROUND

Block Transform-Based Coding

Transform coding is a compression technique used in many digital media (e.g., audio, image and video) compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based encoder/decoder system 100 (also called a "codec") shown in FIG. 1 divides the uncompressed digital image's pixels into fixed-size two dimensional blocks ($X_1, \ldots X_n$), each block possibly overlapping with other blocks. A linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$).

The block transform 120-121 can be defined as a mathematical operation on a vector x of size N. Most often, the operation is a linear multiplication, producing the transform domain output y=Mx, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations. The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as show in FIG. 1. While reconstructing the data, the inverse matrix $M^{-1}$ (inverse transform 170-171) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks.

Quantization

Quantization is the primary mechanism for most image and video codecs to control compressed image quality and compression ratio. According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, with or without dead zone, and adaptive or non-adaptive quantization.

The quantization operation is essentially a biased division by a quantization parameter QP which is performed at the encoder. The inverse quantization or multiplication operation is a multiplication by QP performed at the decoder. These processes together introduce a loss in the original transform coefficient data, which shows up as compression errors or artifacts in the decoded image.

SUMMARY

The following Detailed Description presents tools and techniques to control computational complexity and precision of decoding with a digital media codec. In one aspect of the techniques, the encoder signals one of scaled or unscaled precision modes to use at the decoder. In the scaled precision mode, the input image is pre-multiplied (e.g., by 8) at the encoder. The output at the decoder also is scaled by rounded division. In the unscaled precision mode, no such scaling operations are applied. In the unscaled precision mode, the encoder and decoder can deal with a smaller dynamic range for transform coefficient, and thus has lower computational complexity.

In another aspect of the techniques, the codec may also signal the precision required for performing transform operations to the decoder. In one implementation, an element of the bitstream syntax signals whether to employ a lower precision arithmetic operations for the transform at the decoder.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following description relates to techniques to control precision and computational complexity of a transform-based digital media codec. The following description describes an example implementation of the technique in the context of a digital media compression system or codec. The digital media system codes digital media data in a compressed form for transmission or storage, and decodes the data for playback or other processing. For purposes of illustration, this exemplary compression system incorporating the computational complexity and precision control is an image or video compression system. Alternatively, the technique also can be incorporated into compression systems or codecs for other digital media data. The computational complexity and precision control technique does not require that the digital media compression system encodes the compressed digital media data in a particular coding format.

1. Encoder/Decoder

Figure 1:
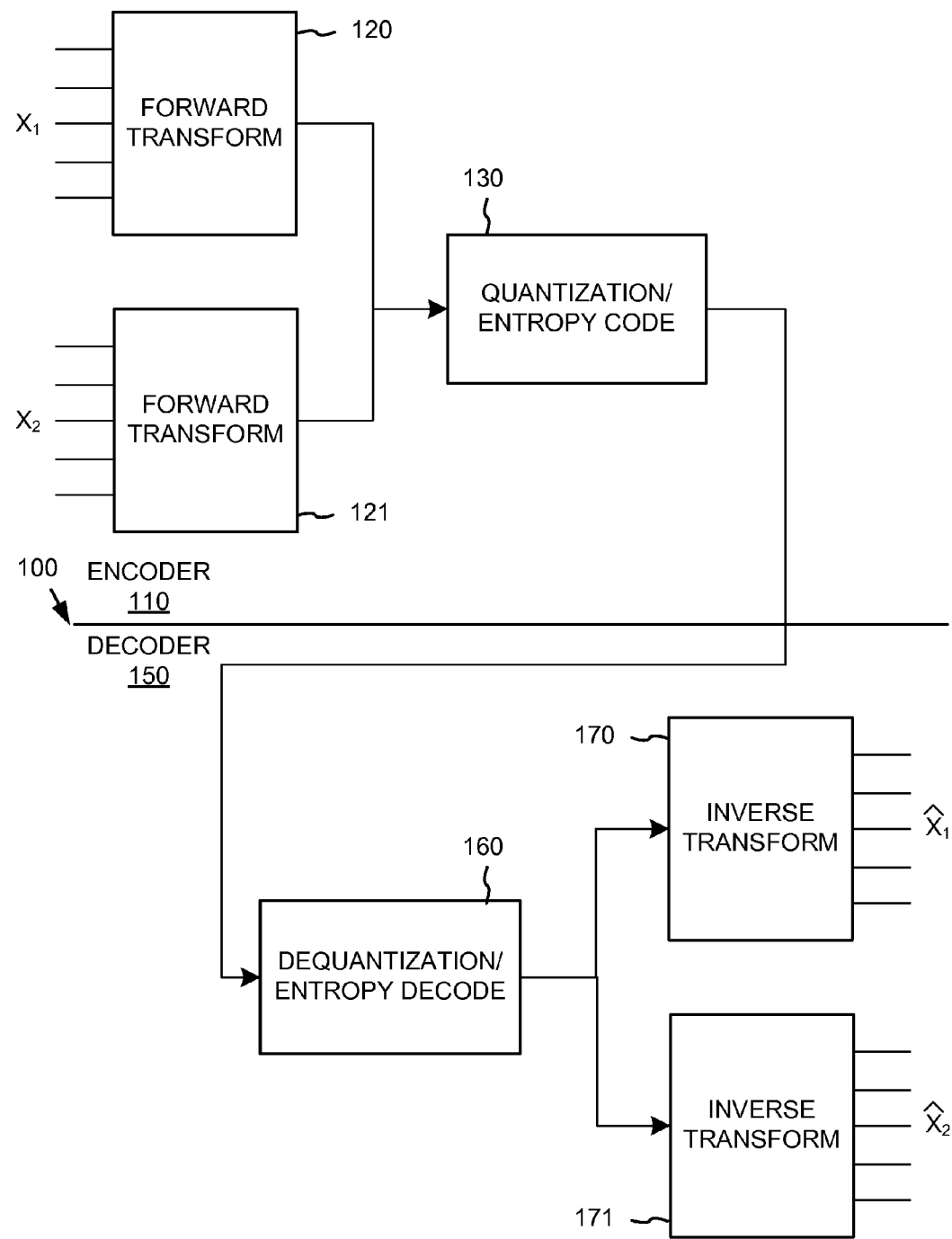
FIG. 1 is a block diagram of a conventional block transform-based codec in the prior art.
Figure 2:
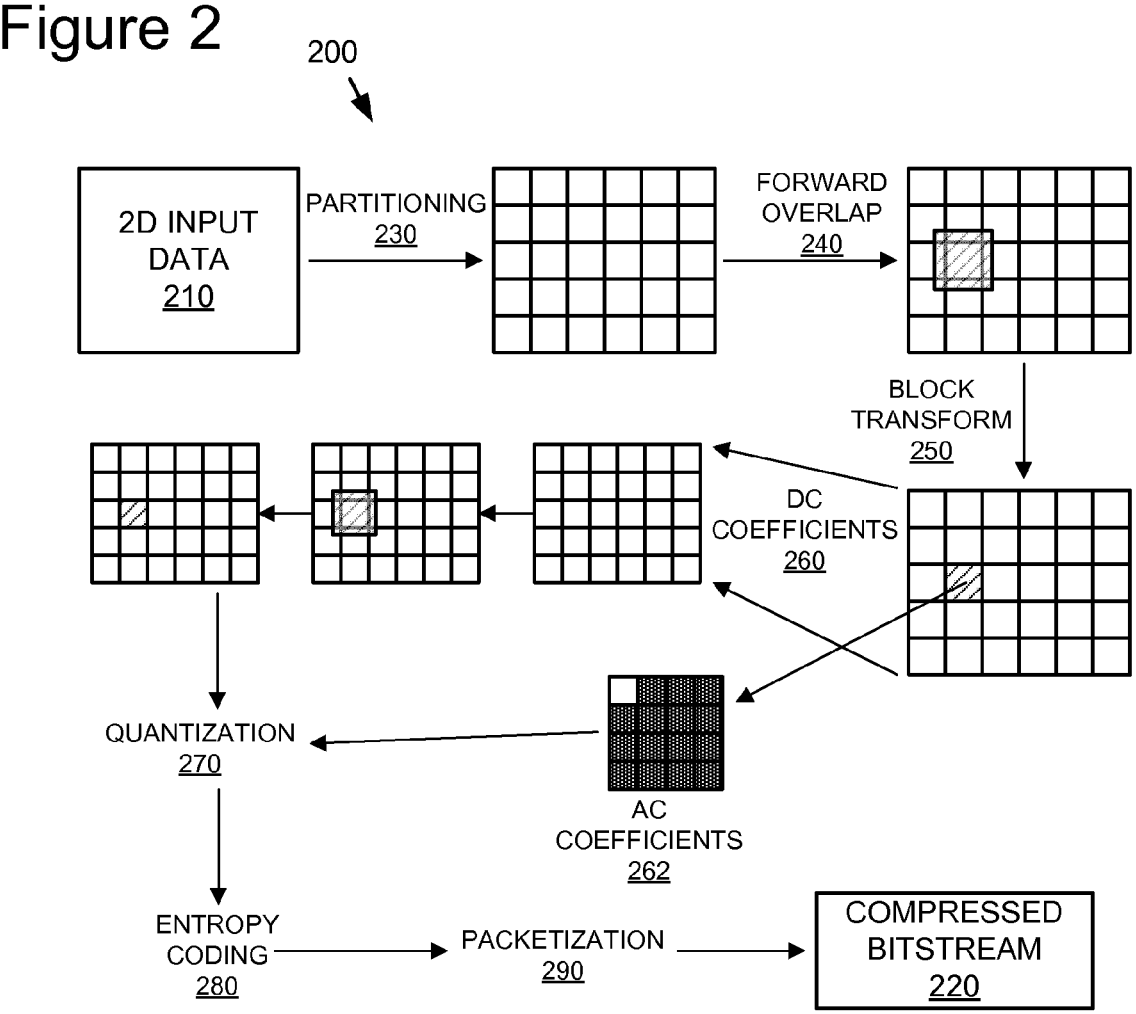
FIG. 2 is a flow diagram of a representative encoder incorporating the block pattern coding.
Figure 3:
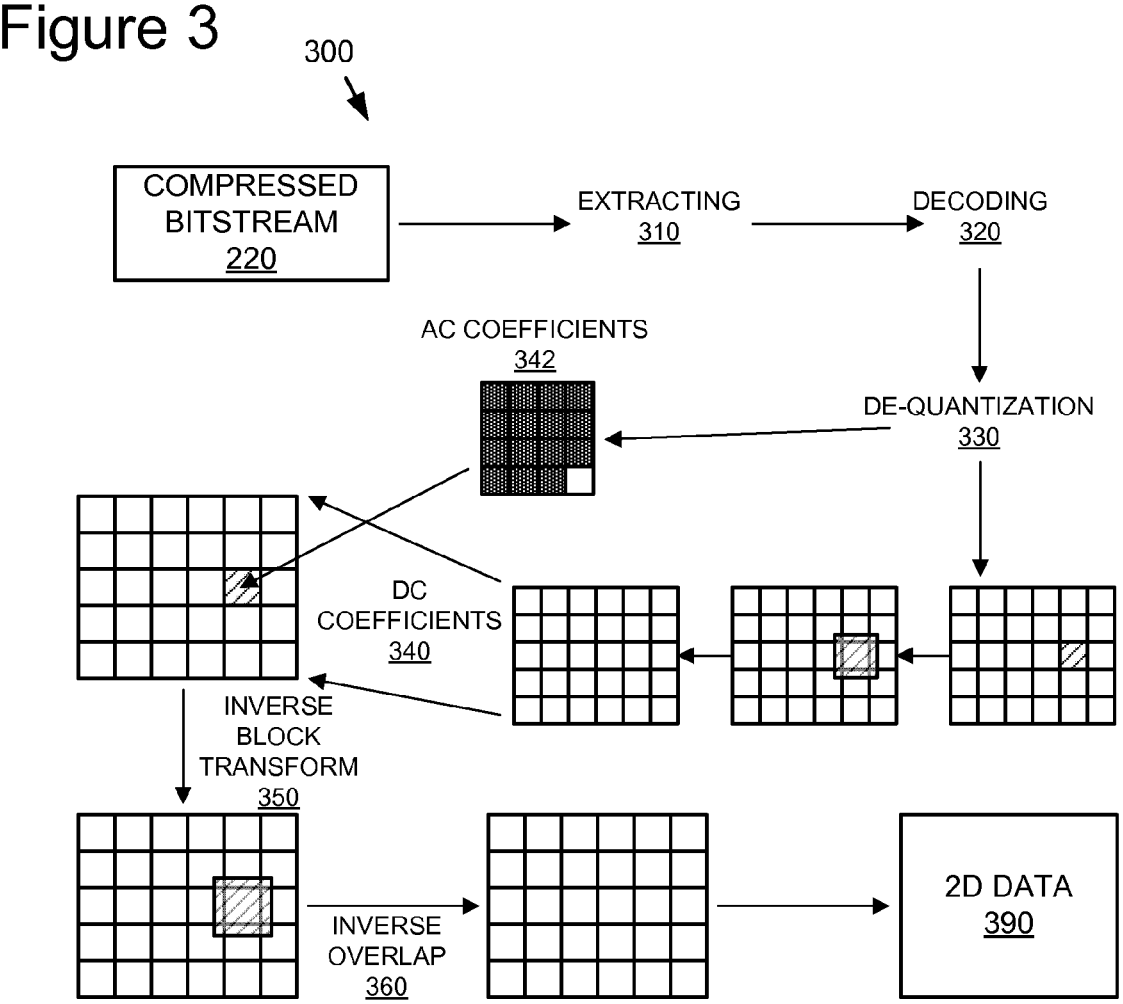
FIG. 3 is a flow diagram of a representative decoder incorporating the block pattern coding.

FIGS. 2 and 3 are a generalized diagram of the processes employed in a representative 2-dimensional (2D) data encoder 200 and decoder 300. The diagrams present a generalized or simplified illustration of a compression system incorporating the 2D data encoder and decoder that implement compression using the computational complexity and precision control techniques. In alternative compression systems using the control techniques, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 200 produces a compressed bitstream 220 that is a more compact representation (for typical input) of 2D data 210 presented as input to the encoder. For example, the 2D data input can be an image, a frame of a video sequence, or other data having two dimensions. The 2D data encoder divides a frame of the input data into blocks (illustrated generally in FIG. 2 as partitioning 230), which in the illustrated implementation are non-overlapping 4×4 pixel blocks that form a regular pattern across the plane of the frame. These blocks are grouped in clusters, called macroblocks, which are 16×16 pixels in size in this representative encoder. In turn, the macroblocks are grouped into regular structures called tiles. The tiles also form a regular pattern over the image, such that tiles in a horizontal row are of uniform height and aligned, and tiles in a vertical column are of uniform width and aligned. In the representative encoder, the tiles can be any arbitrary size that is a multiple of 16 in the horizontal and/or vertical direction. Alternative encoder implementations can divide the image into block, macroblock, tiles, or other units of other size and structure.

A "forward overlap" operator 240 is applied to each edge between blocks, after which each 4×4 block is transformed using a block transform 250. This block transform 250 can be the reversible, scale-free 2D transform described by Srinivasan, U.S. patent application Ser. No. 11/015,707, entitled, "Reversible Transform For Lossy And Lossless 2-D Data Compression," filed Dec. 17, 2004. The overlap operator 240 can be the reversible overlap operator described by Tu et al., U.S. patent application Ser. No. 11/015,148, entitled, "Reversible Overlap Operator for Efficient Lossless Data Compression," filed Dec. 17, 2004; and by Tu et al., U.S. patent application Ser. No. 11/035,991, entitled, "Reversible 2-Dimensional Pre-/Post-Filtering For Lapped Biorthogonal Transform," filed Jan. 14, 2005. Alternatively, the discrete cosine transform or other block transforms and overlap operators can be used. Subsequent to the transform, the DC coefficient 260 of each 4×4 transform block is subject to a similar processing chain (tiling, forward overlap, followed by 4×4 block transform). The resulting DC transform coefficients and the AC transform coefficients are quantized 270, entropy coded 280 and packetized 290.

The decoder performs the reverse process. On the decoder side, the transform coefficient bits are extracted 310 from their respective packets, from which the coefficients are themselves decoded 320 and dequantized 330. The DC coefficients 340 are regenerated by applying an inverse transform, and the plane of DC coefficients is "inverse overlapped" using a suitable smoothing operator applied across the DC block edges. Subsequently, the entire data is regenerated by applying the 4×4 inverse transform 350 to the DC coefficients, and the AC coefficients 342 decoded from the bitstream. Finally, the block edges in the resulting image planes are inverse overlap filtered 360. This produces a reconstructed 2D data output.

In an exemplary implementation, the encoder 200 (FIG. 2) compresses an input image into the compressed bitstream 220 (e.g., a file), and the decoder 300 (FIG. 3) reconstructs the original input or an approximation thereof, based on whether lossless or lossy coding is employed. The process of encoding involves the application of a forward lapped transform (LT) discussed below, which is implemented with reversible 2-dimensional pre-/post-filtering also described more fully below. The decoding process involves the application of the inverse lapped transform (ILT) using the reversible 2-dimensional pre-/post-filtering.

The illustrated LT and the ILT are inverses of each other, in an exact sense, and therefore can be collectively referred to as a reversible lapped transform. As a reversible transform, the LT/ILT pair can be used for lossless image compression.

The input data 210 compressed by the illustrated encoder 200/decoder 300 can be images of various color formats (e.g., RGB/YUV4:4:4, YUV4:2:2 or YUV4:2:0 color image formats). Typically, the input image always has a luminance (Y) component. If it is a RGB/YUV4:4:4, YUV4:2:2 or YUV4:2:0 image, the image also has chrominance components, such as a U component and a V component. The separate color planes or components of the image can have different spatial resolutions. In case of an input image in the YUV 4:2:0 color format for example, the U and V components have half of the width and height of the Y component.

As discussed above, the encoder 200 tiles the input image or picture into macroblocks. In an exemplary implementation, the encoder 200 tiles the input image into 16×16 pixel areas (called "macroblocks") in the Y channel (which may be 16×16, 16×8 or 8×8 areas in the U and V channels depending on the color format). Each macroblock color plane is tiled into 4×4 pixel regions or blocks. Therefore, a macroblock is composed for the various color formats in the following manner for this exemplary encoder implementation:

1. For a grayscale image, each macroblock contains 16 4×4 luminance (Y) blocks.
2. For a YUV4:2:0 format color image, each macroblock contains 16 4×4 Y blocks, and 4 each 4×4 chrominance (U and V) blocks.
3. For a YUV4:2:2 format color image, each macroblock contains 16 4×4 Y blocks, and 8 each 4×4 chrominance (U and V) blocks.
4. For a RGB or YUV4:4:4 color image, each macroblock contains 16 blocks each of Y, U and V channels.

Accordingly, after transform, a macroblock in this representative encoder 200/decoder 300 has three frequency sub bands: a DC sub band (DC macroblock), a low pass sub band (low pass macroblock), and a high pass sub band (high pass macroblock). In the representative system, the low pass and/or high pass sub bands are optional in the bitstream—these sub bands may be entirely dropped.

Further, the compressed data can be packed into the bitstream in one of two orderings: spatial order and frequency order. For the spatial order, different sub bands of the same macroblock within a tile are ordered together, and the resulting bitstream of each tile is written into one packet. For the frequency order, the same sub band from different macroblocks within a tile are grouped together, and thus the bitstream of a tile is written into three packets: a DC tile packet, a low pass tile packet, and a high pass tile packet. In addition, there may be other data layers.

Thus, for the representative system, an image is organized in the following "dimensions":
Spatial dimension: Frame→Tile→Macroblock;
Frequency dimension: DC|Low pass|High pass; and
Channel dimension: Luminance|Chrominance_0|Chrominance_1 . . . (e.g. as Y|U|V).
The arrows above denote a hierarchy, whereas the vertical bars denote a partitioning.

Although the representative system organizes the compressed digital media data in spatial, frequency and channel dimensions, the flexible quantization approach described here can be applied in alternative encoder/decoder systems that organize their data along fewer, additional or other dimensions. For example, the flexible quantization approach can be applied to coding using a larger number of frequency bands, other format of color channels (e.g., YIQ, RGB, etc.), additional image channels (e.g., for stereo vision or other multiple camera arrays).

2. Inverse Core and Lapped Transform

Overview

In one implementation of the encoder 200/decoder 300, the inverse transform on the decoder side takes the form of a two-level lapped transform. The steps are as follows:

An Inverse Core Transform (ICT) is applied to each 4×4 block corresponding to reconstructed DC and lowpass coefficients arranged in a planar array known as the DC plane.

A post filter operation is optionally applied to 4×4 areas evenly straddling blocks in the DC plane. Further, a post filter is applied to boundary 2×4 and 4×2 areas, and the four 2×2 corner areas are left untouched.

The resulting array contains DC coefficients of the 4×4 blocks corresponding to the first-level transform. The DC coefficients are (figuratively) copied into a larger array, and the reconstructed highpass coefficients populated into the remaining positions.

An ICT is applied to each 4×4 block.

A post filter operation is optionally applied to 4×4 areas evenly straddling blocks in the DC plane. Further, a post filter is applied to boundary 2×4 and 4×2 areas, and the four 2×2 corner areas are left untouched.

Figure 4:
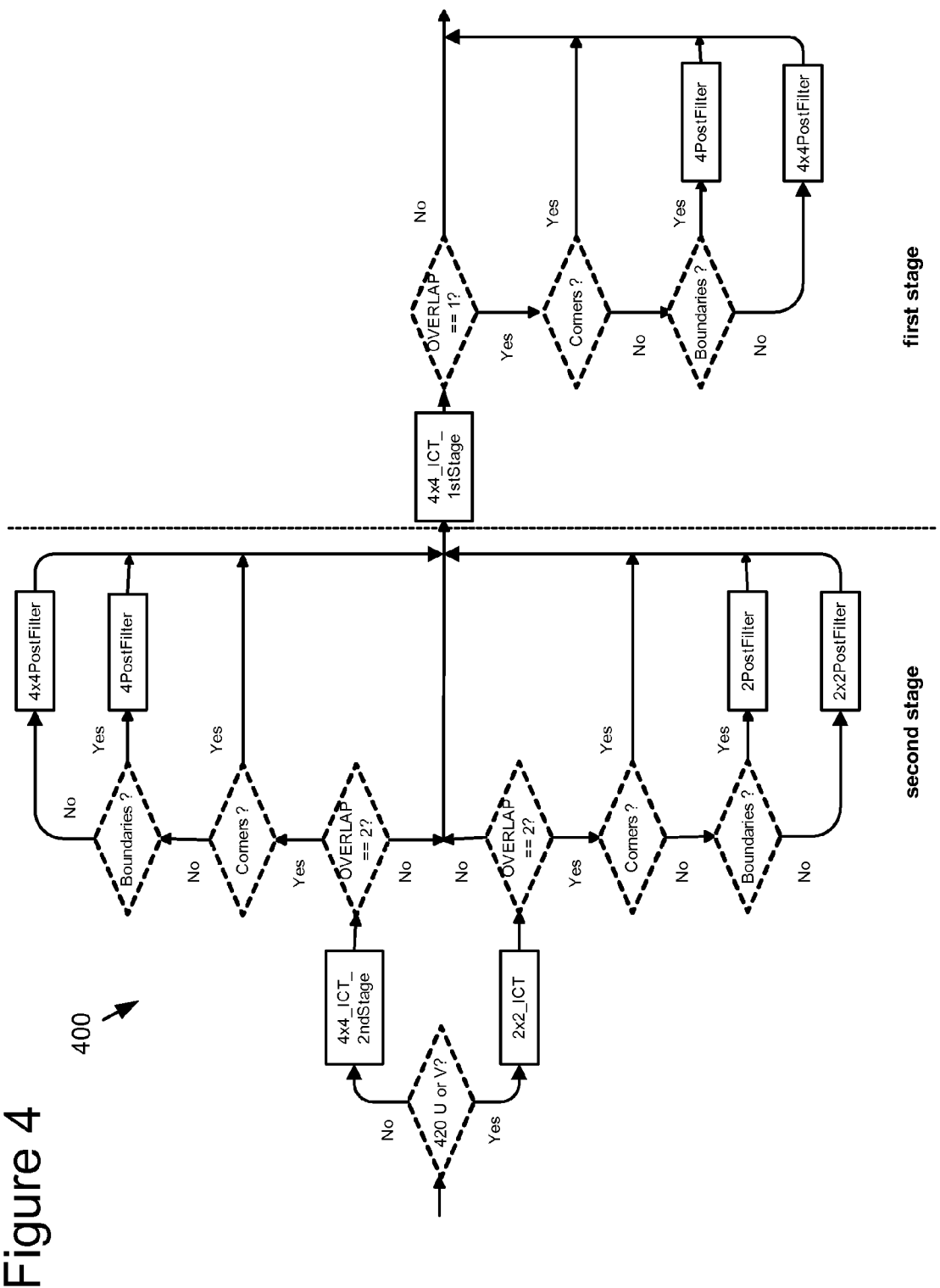
FIG. 4 is a diagram of the inverse lapped transform including a core transform and post-filter (overlap) operation in one implementation of the representative encoder/decoder of FIGS. 2 and 3.

This process is shown in FIG. 4.

The application of post filters is governed by an OVERLAP_INFO syntax element in the compressed bitstream 220. OVERLAP_INFO may take on three values:
If OVERLAP_INFO=0, no post filtering is performed.
If OVERLAP_INFO=1, only the outer post filtering is performed.
If OVERLAP_INFO=2, both inner and outer post filtering is performed.

Inverse Core Transform

The Core Transform (CT) is inspired by the conventionally known 4×4 Discrete Cosine Transform (DCT), yet it is fundamentally different. The first key difference is that the DCT is linear whereas the CT is nonlinear. The second key difference is that due to the fact that it is defined on real numbers, the DCT is not a lossless operation in the integer to integer space. The CT is defined on integers and is lossless in this space. The third key difference is that the 2D DCT is a separable operation. The CT is non-separable by design.

The entire inverse transform process can be written as the cascade of three elementary 2×2 transform operations, which are:
2×2 Hadamard transform: T_h
Inverse 1D rotate: InvT_odd
Inverse 2D rotate: InvT_odd_odd These transforms are implemented as non-separable operations and are described first, followed by the description of the entire ICT.

2D 2×2 Hadamard Transform T_h

The encoder/decoder implements the 2D 2×2 Hadamard transform T_h as shown in the following pseudo-code table. R is a rounding factor which may take on the value 0 or 1 only. T_h is involutory (i.e. two applications of T_h on a data vector

[a b c d] succeed in recovering the original values of [a b c d], provided R is unchanged between the applications). The inverse T_h is T_h itself.

```
T_h (a,b,c,d, R) {
    a += d;
    b -= c;
    int t1 = ((a - b + R) >> 1);
    int t2 = c;
    c = t1 - d;
    d = t1 - t2;
    a -= d;
    b += c;
}
```

Inverse 1D Rotate InvT_odd

The lossless inverse of T_odd is defined by the pseudocode in the following table.

```
InvT_odd (a,b,c,d) {
    b += d;
    a -= c;
    d -= (b >> 1);
    c += ((a + 1) >> 1);
    a -= ((3*b + 4) >> 3);
    b += ((3*a + 4) >> 3);
    c -= ((3*d + 4) >> 3);
    d += ((3*c + 4) >> 3);
    c -= ((b + 1) >> 1);
    d = ((a + 1) >> 1) - d;
    b += c;
    a -= d;
}
```

Inverse 2D Rotate InvT_odd_odd

Inverse 2D rotate InvT_odd_odd is defined by the pseudocode in the following table.

```
InvT_odd_odd (a,b,c,d) {
    int t1, t2;
    d += a;
    c -= b;
    a -= (t1 = d >> 1);
    b += (t2 = c >> 1);
    a -= ((b * 3 + 3) >> 3);
    b += ((a * 3 + 3) >> 2);
    a -= ((b * 3 + 4) >> 3);
    b -= t2;
    a += t1;
    c += b;
    d -= a;
    b = -b;
    c = -c;
}
```

ICT Operations

Figure 5:
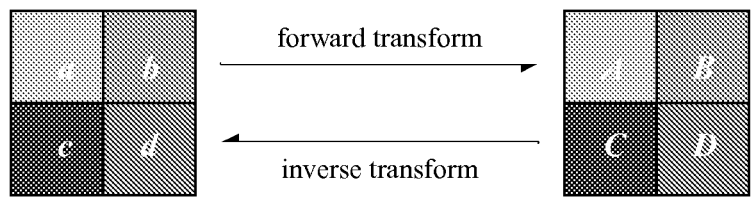
FIG. 5 is a diagram of identifying the input data points for the transform operations.

The correspondence between 2×2 data and the previously listed pseudocode is shown in FIG. 5. Color coding using four gray levels to indicate the four data points is introduced here, to facilitate the transform description in the next section.

The 2D 4×4 point ICT is built using T_h, inverse T_odd and inverse T_odd_odd. Note the inverse T_h is T_h itself. The ICT is composed of two stages, which are shown in the following pseudo-code. Each stage consists of four 2×2 transforms which may be done in any arbitrary sequence, or concurrently, within the stage.

If the input data block is $$\begin{bmatrix} a & b & c & d \\ e & f & g & h \\ i & j & k & l \\ m & n & o & p \end{bmatrix},$$

4×4_IPCT__1stStage( ) and 4×4_IPCT__2ndStage( ) are defined as:

```
4x4_IPCT (a...p) {
    T_h(a, c, i, k);
    InvT_odd(b, d, j, l);
    InvT_odd(e, m, g, o);
    InvT_odd_odd(f, h, n, p);
    T_h(a, d, m, p);
    T_h(k, j, g, f);
    T_h(c, b, o, n);
    T_h(i, l, e, h);
}
```

The function 2×2_ICT is the same as T_h.

Post Filtering Overview

Four operators determine the post filters used in the inverse lapped transform. These are:

4×4 post filter 4 point post filter

2×2 post filter 2 point post filter

The post-filter uses T_h, InvT_odd_odd, invScale and invRotate. invRotate and invScale are defined in the below tables, respectively.

```
invRotate (a,b) {
    a -= ((b * 3 + 8) >> 4);
    b += ((a * 3 + 4) >> 3);
    a -= ((b * 3 + 8) >> 4);
}
```

```
invScale (a,b) {
    b += a;
    a -= ((b + 1) >> 1);
    b += ((a * 3 + 0) >> 3);
    a += ((b * 3 + 8) >> 4);
    b += ((a * 3 + 4) >> 3);
    a += ((b + 1) >> 1);
    b -= a;
}
```

4×4 Post Filter

Primarily, the 4×4 post-filter is applied to all block junctions (areas straddling 4 blocks evenly) in all color planes when OVERLAP_INFO is 1 or 2. Also, the 4×4 filter is applied to all block junctions in the DC plane for all planes when OVERLAP_INFO is 2, and for only the luma plane when OVERLAP_INFO is 2 and color format is either YUV 4:2:0 or YUV 4:2:2.

If the input data block is $$\begin{bmatrix} a & b & c & d \\ e & f & g & h \\ i & j & k & l \\ m & n & o & p \end{bmatrix},$$

the 4×4 post-filter, 4×4PostFilter (a, b, c, d, e, f, g, h, i, j, k, l, m, n, o, p), is defined in the following table:

```
4x4PostFilter
      (a,b,...,p) {
    T_h (a, d, m, p, 0);
    T_h (b, c, n, o, 0);
    T_h (e, h, i, l, 0);
    T_h (f, g, j, k, 0);
    invRotate (n, m);
    invRotate (j, i);
    invRotate (h, d);
    invRotate (g, c);
    InvT_odd_odd (k, l, o, p);
    invScale (a, p);
    invScale (b, l);
    invScale (e, o);
    invScale (f, k);
    T_h (a, m, d, p, 0);
    T_h (b, n, c, o, 0);
    T_h (e, i, h, l, 0);
    T_h (f, j, g, k, 0);
}
```

4-Point Post-Filter

Linear 4-point filters are applied to edge straddling 2×4 and 4×2 areas on the boundary of the image. If the input data is [a b c d], the 4-point post-filter, 4PostFilter(a, b, c, d), is defined in the following table.

```
4PostFilter (a,b,c,d) {
    a += d;
    b += c;
    d -= ((a + 1) >> 1);
    c -= ((b + 1) >> 1);
    invRotate(c, d);
    d += ((a + 1) >> 1);
    c += ((b + 1) >> 1);
    a -= d - ((d * 3 + 16) >> 5);
    b -= c - ((c * 3 + 16) >> 5);
    d += ((a * 3 + 8) >> 4);
    c += ((b * 3 + 8) >> 4);
    a += ((d * 3 + 16) >> 5);
    b += ((c * 3 + 16) >> 5);
}
```

2×2 Post-Filter

The 2×2 post-filter is applied to areas straddling blocks in the DC plane for the chroma channels of YUV 4:2:0 and YUV 4:2:2 data. If the input data is $$\begin{bmatrix} a & b \\ c & d \end{bmatrix},$$

the 2×2 post-filter 2×2PostFilter (a, b, c, d), is defined in the following table:

```
2x2PostFilter
      (a,b,c,d) {
    a += d;
    b += c;
    d -= ((a + 1) >> 1);
    c -= ((b + 1) >> 1);
    b += ((a + 2) >> 2);
    a += ((b + 1) >> 1);
    b += ((a + 2) >> 2);
    d += ((a + 1) >> 1);
    c += ((b + 1) >> 1);
    a -= d;
    b -= c;
}
```

2-Point Post-Filter

The 2-point post filter is applied to boundary 2×1 and 1×2 samples that straddle blocks. The 2-point post-filter, 2PostFilter (a, b) is defined in the following table:

```
2PostFilter (a,b) {
    b += ((a + 4) >> 3);
    a += ((b + 2) >> 2);
    b += ((a + 4) >> 3);
}
```

Signaling of the precision required for performing transform operations of the above described lapped transform can be performed in the header of a compressed image structure. In the example implementation, LONG_WORD_FLAG and NO_SCALED_FLAGS are syntax elements transmitted in the compressed bitstream (e.g., in the image header) to signal precision and computational complexity to be applied by the decoder.

3. Precision and Word Length

The example encoder/decoder performs integer operations. Further, the example encoder/decoder supports lossless encoding and decoding. Therefore, the primary machine precision required by the example encoder/decoder is integer.

However, integer operations defined in the example encoder/decoder lead to rounding errors for lossy coding. These errors are small by design, however they cause drops in the rate distortion curve. For the sake of improved coding performance by the reduction of rounding errors, the example encoder/decoder defines a secondary machine precision. In this mode, the input is pre multiplied by 8 (i.e. left shifted by 3 bits) and the final output is divided by 8 with rounding (i.e. right shifted by 3 bits). These operations are carried out at the front end of the encoder and the rear end of the decoder, and are largely invisible to the rest of the processes. Further, the quantization levels are scaled accordingly such that a stream created with the primary machine precision and decoded using the secondary machine precision (and vice versa) produces an acceptable image.

The secondary machine precision cannot be used when lossless compression is desired. The machine precision used in creating a compressed file is explicitly marked in the header.

The secondary machine precision is equivalent to using scaled arithmetic in the codec, and hence this mode is referred to as Scaled. The primary machine precision is referred to as Unscaled.

The example encoder/decoder is designed to provide good encoding and decoding speed. A design goal of the example encoder/decoder is that the data values on both encoder and decoder do not exceed 16 signed bits for an 8 bit input.

(However, intermediate operation within a transform stage may exceed this figure.) This holds true for both modes of machine precision.

Conversely, when the secondary machine precision is chosen, the range expansion of the intermediate values is by 8 bits. Since the primary machine precision avoids a pre-multiplication by 8, its range expansion is 8−3=5 bits.

The first example encoder/decoder uses two different word lengths for intermediate values. These word lengths are 16 and 32 bits.

Second Example Bitstream Syntax and Semantics

The second example bitstream syntax and semantics is hierarchical and is comprised of the following layers: Image, Tile, Macroblock and Block.

| | Num bits | Descriptor |
|---|---|---|
| Image (IMAGE) | | |
| IMAGE ( ){ | | |
|   IMAGE_HEADER | Variable | struct |
|   bAlphaPlane = FALSE | | |
|   IMAGE_PLANE_HEADER | Variable | struct |
|   if(ALPHACHANNEL_FLAG) { | | |
|     bAlphaPlane = TRUE | | |
|     IMAGE_PLANE_HEADER | Variable | Struct |
|   } | | |
|   INDEX_TABLE | Variable | struct |
|   TILE | Variable | struct |
| } | | |
| Image Header (IMAGE_HEADER) | | |
| IMAGE_HEADER ( ){ | | |
|   GDISIGNATURE | 64 | uimsbf |
|   RESERVED1 | 4 | uimsbf |
|   RESERVED2 | 4 | uimsbf |
|   TILING_FLAG | 1 | bool |
|   FREQUENCYMODE_BITSTREAM_FLAG | 1 | uimsbf |
|   IMAGE_ORIENTATION | 3 | uimsbf |
|   INDEXTABLE_PRESENT_FLAG | 1 | uimsbf |
|   OVERLAP_INFO | 2 | uimsbf |
|   SHORT_HEADER_FLAG | 1 | bool |
|   LONG_WORD_FLAG | 1 | bool |
|   WINDOWING_FLAG | 1 | bool |
|   TRIM_FLEXBITS_FLAG | 1 | bool |
|   RESERVED3 | 3 | uimsbf |
|   ALPHACHANNEL_FLAG | 1 | bool |
|   SOURCE_CLR_FMT | 4 | uimsbf |
|   SOURCE_BITDEPTH | 4 | uimsbf |
|   If(SHORT_HEADER_FLAG) { | | |
|     WIDTH_MINUS1 | 16 | uimsbf |
|     HEIGHT_MINUS1 | 16 | uimsbf |
|   } | | |
|   else { | | |
|     WIDTH_MINUS1 | 32 | uimsbf |
|     HEIGHT_MINUS1 | 32 | uimsbf |
|   } | | |
|   if(TILING_FLAG) { | | |
|     NUM_VERT_TILES_MINUS1 | 12 | uimsbf |
|     NUM_HORIZ_TILES_MINUS1 | 12 | uimsbf |
|   } | | |
|   for (n = 0; n < NUM_VERT_TILES_MINUS1; N++) { | | |
|     If (SHORT_HEADER_FLAG) | | |
|       WIDTH_IN_MB_OF_TILE_MINUS1[n] | 8 | uimsbf |
|     else | | |
|       WIDTH_IN_MB_OF_TILE_MINUS1[n] | 16 | uimsbf |
|   } | | |
|   for (n = 0; n < NUM_HORIZ_TILES_MINUS1; n++) { | | |
|     If (SHORT_HEADER_FLAG) | | |
|       HEIGHT_IN_MB_OF_TILE_MINUS1[n] | 8 | uimsbf |
|     else | | |
|       HEIGHT_IN_MB_OF_TILE_MINUS1[n] | 16 | uimsbf |
|   } | | |
|   if (WINDOWING_FLAG) { | | |
|     NUM_TOP_EXTRAPIXELS | 6 | uimsbf |

|  | Num bits | Descriptor |
|---|---|---|
|     NUM_LEFT_EXTRAPIXELS | 6 | uimsbf |
|  | 6 | uimsbf |
| NUM_BOTTOM_EXTRAPIXELS |  |  |
|     NUM_RIGHT_EXTRAPIXELS | 6 | uimsbf |
|   } |  |  |
| } |  |  |
| IMAGE_PLANE_HEADER ( ) { |  |  |
|   CLR_FMT | 3 | uimsbf |
|   NO_SCALED_FLAG | 1 | bool |
|   BANDS_PRESENT | 4 | uimsbf |
|   if (CLR_FMT == YUV444) { |  |  |
|     CHROMA_CENTERING | 4 | uimsbf |
|     COLOR_INTERPRETATION | 4 | uimsbf |
|   } |  |  |
|   Else if (CLR_FMT == NCHANNEL) { |  |  |
|     NUM_CHANNELS_MINUS1 | 4 | uimsbf |
|     COLOR_INTERPRETATION | 4 | uimsbf |
|   } |  |  |
|   if (SOURCE_CLR_FMT == BAYER) { |  |  |
|     BAYER_PATTERN | 2 | uimsbf |
|     CHROMA_CENTERING_BAYER | 2 | uimsbf |
|     COLOR_INTERPRETATION | 4 | uimsbf |
|   } |  |  |
|   if (SOURCE_BITDEPTH ∈ |  |  |
|     {BD16,BD16S,BD32,BD32S}) { |  |  |
|     SHIFT_BITS | 8 | uimsbf |
|   } |  |  |
|   if (SOURCE_BITDEPTH == BD32F) { |  |  |
|     LEN_MANTISSA | 8 | uimsbf |
|     EXP_BIAS | 8 | uimsbf |
|   } |  |  |
|   DC_FRAME_UNIFORM | 1 | bool |
|   if (DC_FRAME_UNIFORM) { |  |  |
|     DC_QP( ) | variable | struct |
|   } |  |  |
|   if (BANDS_PRESENT != SB_DC_ONLY) { |  |  |
|     USE_DC_QP | 1 | bool |
|     if (USE_DC_QP == FALSE) { |  |  |
|       LP_FRAME_UNIFORM | 1 | bool |
|       if (LP_FRAME_UNIFORM) { |  |  |
|         NUM_LP_QPS = 1 |  |  |
|         LP_QP( ) | variable | struct |
|       } |  |  |
|     } |  |  |
|     if (BANDS_PRESENT != SB_NO_HIGHPASS) { |  |  |
|       USE_LP_QP | 1 | bool |
|       if (USE_LP_QP == FALSE) { |  |  |
|         HP_FRAME_UNIFORM | 1 | bool |
|         if (HP_FRAME_UNIFORM) { |  |  |
|           NUM_HP_QPS = 1 |  |  |
|           HP_QP( ) | variable | struct |
|         } |  |  |
|       } |  |  |
|     } |  |  |
|   } |  |  |
|   FLUSH_BYTE | variable |  |
| } |  |  |

Some selected bitstream elements from the second example bitstream syntax and semantics are defined below.

Long Word Flag (LONG_WORD_FLAG) (1 bit)

LONG_WORD_FLAG is a 1-bit syntax element and specifies whether 16-bit integers may be used for transform computations. In this second example bitstream syntax, if LONG_WORD_FLAG==0 (FALSE), 16-bit integer numbers and arrays may be used for the outer stage of transform computations (intermediate operations within the transform (such as $(3*a+1)>>1$) are performed with higher accuracy). If LONG_WORD_FLAG==TRUE, 32-bit integer numbers and arrays shall be used for transform computations.

Note: 32-bit arithmetic may be used to decode an image regardless of the value of LONG_WORD_FLAG. This syntax element can be used by the decoder to choose the most efficient word length for implementation.

No Scaled Arithmetic Flag (NO_SCALED_FLAG)(1 bit)

NO_SCALED_FLAG is a 1-bit syntax element that specifies whether the transform uses scaling. If NO_SCALED_FLAG==1, scaling shall not be performed. If NO_SCALED_FLAG==0, scaling shall be used. In this case, scaling shall be performed by appropriately rounding down the output of the final stage (color conversion) by 3 bits.

Note: NO_SCALED_FLAG shall be set to TRUE if lossless coding is desired, even if lossless coding is used for only a subregion of an image. Lossy coding may use either mode.

Note: The rate-distortion performance for lossy coding is superior when scaling is used (i.e. NO_SCALED_FLAG==FALSE), especially at low QPs.

4. Signaling and Use of Long Word Flag

One example image format for the representative encoder/decoder supports a wide range of pixel formats, including high dynamic range and wide gamut formats. Supported data types include signed integer, unsigned integer, fixed-point float and floating-point float. Supported bit depths include eight, 16, 24 and 32 bits per color channel. The example image format allows for lossless compression of images that use up to 24 bits per color channel, and lossy compression of images that use up to 32 bits per color channel.

At the same time, the example image format has been designed to provide high quality images and compression efficiency and allow low-complexity encoding and decoding implementations.

To support low-complexity implementation, the transform in an example image format has been designed to minimize expansion in dynamic range. The two-stage transform increases dynamic range by only five bits. Therefore, if the image bit depth is eight bits per color channel, 16 bit arithmetic may be sufficient for performing all transform operations at the decoder. For other bit depths, higher precision arithmetic may be needed for transform operations.

The computational complexity of decoding a particular bitstream can be reduced if the precision required for performing transform operations is known at the decoder. This information can be signaled to a decoder using a syntax element (e.g., a 1-bit flag in an image header). Described signaling techniques and syntax elements can reduce computational complexity in decoding bitstreams.

In one example implementation, the 1-bit syntax element LONG_WORD_FLAG is used. For example, if LONG_WORD_FLAG==FALSE, 16-bit integer numbers and arrays may be used for the outer stage of transform computations, and if LONG_WORD_FLAG==TRUE, 32 bit integer numbers and arrays shall be used for transform computations.

In the one implementation of the representative encoder/decoder, the in-place transform operations may be performed on 16-bit wide words, but intermediate operations within the transform (such as computation of the product 3*a for a "lifting" step given by b+=(3*a+1)>>1)) are performed with higher accuracy (e.g., 18 bits or higher precision). However, in this example, the intermediate transform values a and b themselves may be stored in 16-bit integers.

32-bit arithmetic may be used to decode an image regardless of the value of the LONG_WORD_FLAG element. The LONG_WORD_FLAG element can be used by the encoder/decoder to choose the most efficient word length for implementation. For example, an encoder may choose to set the LONG_WORD_FLAG element to FALSE if it can verify that the 16-bit and 32-bit precision transform steps produce the same output value.

5. Signaling and Use of NO_SCALED_FLAG

One example image format for the representative encoder/decoder supports a wide range of pixel formats, including high dynamic range and wide gamut formats. At the same time, the design of the representative encoder/decoder optimizes image quality and compression efficiency and enables low-complexity encoding and decoding implementations.

As discussed above, the representative encoder/decoder uses two stage hierarchical block-based transform, where all the transform steps are integer operations. The small rounding errors present in these integer operations result in loss of compression efficiency during lossy compression. To combat this problem, one implementation of the representative encoder/decoder defines two different precision modes for decoder operations: the scaled mode and the unscaled mode.

In the scaled precision mode, the input image is pre multiplied by 8 (i.e. left shifted by 3 bits) at the encoder, and the final output at the decoder is divided by 8 with rounding (i.e. right shifted by 3 bits). Operation in the scaled precision mode minimizes the rounding errors, and results in improved rate-distortion performance.

In the unscaled precision mode, there is no such scaling. An encoder or decoder operating in unscaled precision mode has to deal with a smaller dynamic range for transform coefficients, and thus has lower computational complexity. However, there is a small penalty in compression efficiency for operating in this mode. Lossless coding (with no quantization, i.e. setting the Quantization Parameter or QP to 1) can only use the unscaled precision mode for guaranteed reversibility.

The precision mode used by the encoder in creating a compressed file is explicitly signaled in the image header of the compressed bitstream 220 (FIG. 2) using the NO_SCALED_FLAG. It is recommended that the decoder 300 use the same precision mode for its operations.

NO_SCALED_FLAG is a 1-bit syntax element in the image header that specifies the precision mode as follows:

If NO_SCALED_FLAG==TRUE, unscaled mode should be used for decoder operation.

If NO_SCALED_FLAG==FALSE, scaling should be used. In this case, scaled mode should be used for operation by appropriately rounding down the output of the final stage (color conversion) by 3 bits.

The rate-distortion performance for lossy coding is superior when unscaled mode is used (i.e. NO_SCALED_FLAG==FALSE), especially at low QPs. However, the computation complexity is lower when unscaled mode is used due to two reasons:

Smaller dynamic range expansion in the unscaled mode means that shorter words may be used for transform computations, especially in conjunction with the "LONG_WORD_FLAG." In VLSI implementations, the reduced dynamic range expansion means that the gate logic implementing the more significant bits may be powered down.

The scaled mode requires an add and right bit shift by 3 bits (implementing a rounded divide by 8) on the decoder side. On the encoder side, it requires a left bit shift by 3 bits. This is slightly more computationally demanding than the unscaled mode overall.

Further, the unscaled mode allows for the compression of more significant bits than does the scaled mode. For instance, the unscaled mode permits the lossless compression (and decompression) of up to 27 significant bits per sample, using 32 bit arithmetic. In contrast, the scaled mode allows the same for only 24 bits. This is because of the three additional bits of dynamic range introduced by the scaling process.

The data values on decoder do not exceed 16 signed bits for an 8 bit input for both modes of precision. (However, intermediate operation within a transform stage may exceed this figure.)

Note: NO_SCALED_FLAG is set to TRUE by the encoder, if lossless coding (QP=1) is desired, even if lossless coding is required for only a subregion of an image.

The encoder may use either mode for lossy compression. It is recommended that the decoder use the precision mode signaled by NO_SCALED_MODE for its operations. However, the quantization levels are scaled such that a stream created with the scaled precision mode and decoded using the unscaled precision mode (and vice versa) produces an acceptable image in most cases.

6. Scaling Arithmetic for Increased Accuracy

In one implementation of the representative encoder/decoder, the transforms (including color conversion) are integer transforms and implemented through a series of lifting steps. In those lifting steps, truncation errors hurt transform performance. For lossy compression cases, to minimize the damage of truncation errors and thus maximize transform performance, input data to a transform needs to be left shifted several bits. However, another highly desired feature is if the input image is 8 bits, then the output of every transform should be within 16 bits. So the number of left shift bits cannot be large. The representative decoder implements a technique of scaling arithmetic to achieve both goals. The scaling arithmetic technique maximizes transform performance by minimizing damage of truncation errors, and still limits output of each transform step to be within 16 bits if input image is 8 bits. This makes simple 16-bit implementation possible.

The transforms utilized in the representative encoder/decoder are integer transforms and implemented by lifting steps. Most lifting steps involve a right shift, which introduces truncation errors. A transform generally involves many lifting steps, and accumulated truncation errors hurt transform performance visibly.

One way to reduce the damage of truncation errors is to left shift the input data before the transform in the encoder, and right shift the same number of bits after transform (combined with quantization) at the decoder. As described above, the representative encoder/decoder has a two-stage transform structure: optional first stage overlap+first stage CT+optional second stage overlap+second stage CT. Experiments show that left shift by 3 bits is necessary to minimize the truncation errors. So in lossy cases, before color conversion, input data may be left shifted by 3 bits, i.e. multiplied or scaled by a factor of 8 (e.g., for the scaled mode described above).

However, color conversion and transforms expand data. If input data is shifted by 3 bits, the output of second stage 4×4 DCT has a 17-bit dynamic range if input data is 8 bits (output of every other transform is still within 16 bits). This is hugely undesired since it prevents 16-bit implementation, a highly desired feature. To get around this, before the second stage 4×4 CT, the input data is right shifted by 1 bit and so the output is also within 16 bits. Since the second stage 4×4 CT applies to only 1/16 of the data (the DC transform coefficients of the first stage DCT), and the data is already scaled up by first stage transform, so the damage of truncation errors here is minimal.

So in lossy cases for 8-bit images, on encoder side, input is left shifted by 3 bits before color conversion, and right shifted 1 bit before second stage 4×4 CT. On the decoder side, the input is left shifted by 1 bit before first stage 4×4 IDCT, and right shifted by 3 bits after color conversion.

7. Computing Environment

The above-described processing techniques for computational complexity and precision signaling in a digital media codec can be realized on any of a variety of digital media encoding and/or decoding systems, including among other examples, computers (of various form factors, including server, desktop, laptop, handheld, etc.); digital media recorders and players; image and video capture devices (such as cameras, scanners, etc.); communications equipment (such as telephones, mobile phones, conferencing equipment, etc.); display, printing or other presentation devices; and etc. The computational complexity and precision signaling techniques in a digital media codec can be implemented in hardware circuitry, in firmware controlling digital media processing hardware, as well as in communication software executing within a computer or other computing environment, such as shown in FIG. 6.

Figure 6:
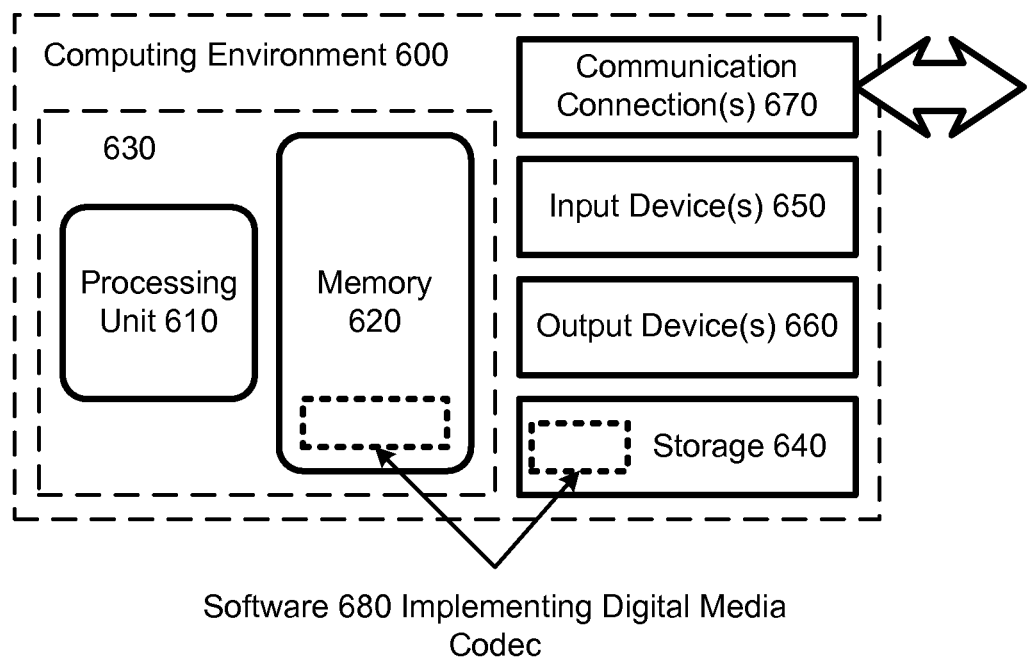
FIG. 6 is a block diagram of a suitable computing environment for implementing the media encoder/decoder of FIGS. 2 and 3.

FIG. 6 illustrates a generalized example of a suitable computing environment (600) in which described embodiments may be implemented. The computing environment (600) is not intended to suggest any limitation as to scope of use or functionality of the invention, as the present invention may be implemented in diverse general-purpose or special-purpose computing environments.

With reference to FIG. 6, the computing environment (600) includes at least one processing unit (610) and memory (620). In FIG. 6, this most basic configuration (630) is included within a dashed line. The processing unit (610) executes computer-executable instructions and may be a real or a virtual processor. In a multi-processing system, multiple processing units execute computer-executable instructions to increase processing power. The memory (620) may be volatile memory (e.g., registers, cache, RAM), non-volatile memory (e.g., ROM, EEPROM, flash memory, etc.), or some combination of the two. The memory (620) stores software (680) implementing the described digital media encoding/decoding with computational complexity and precision signaling techniques.

A computing environment may have additional features. For example, the computing environment (600) includes storage (640), one or more input devices (650), one or more output devices (660), and one or more communication connections (670). An interconnection mechanism (not shown) such as a bus, controller, or network interconnects the components of the computing environment (600). Typically, operating system software (not shown) provides an operating environment for other software executing in the computing environment (600), and coordinates activities of the components of the computing environment (600).

The storage (640) may be removable or non-removable, and includes magnetic disks, magnetic tapes or cassettes, CD-ROMs, CD-RWs, DVDs, or any other medium which can be used to store information and which can be accessed within the computing environment (600). The storage (640) stores instructions for the software (680) implementing the described digital media encoding/decoding with computational complexity and precision signaling techniques.

The input device(s) (650) may be a touch input device such as a keyboard, mouse, pen, or trackball, a voice input device, a scanning device, or another device that provides input to the computing environment (600). For audio, the input device(s) (650) may be a sound card or similar device that accepts audio input in analog or digital form from a microphone or microphone array, or a CD-ROM reader that provides audio samples to the computing environment. The output device(s) (660) may be a display, printer, speaker, CD-writer, or another device that provides output from the computing environment (600).

The communication connection(s) (670) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The described digital media encoding/decoding with flexible quantization techniques herein can be described in the general context of computer-readable media. Computer-readable media are any available media that can be accessed within a computing environment. By way of example, and not limitation, with the computing environment (600), computer-readable media include memory (620), storage (640), communication media, and combinations of any of the above.

The described digital media encoding/decoding with computational complexity and precision signaling techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A digital media decoding method comprising:
   receiving a compressed digital media bitstream at a digital media decoder;
   parsing a syntax element from the bitstream signaling a degree of arithmetic precision to use for transform computations during processing of the digital media data; and
   outputting a reconstructed image.

2. The digital media decoding method of claim 1 wherein the syntax element signals to use one of a high arithmetic precision or a low arithmetic precision.

3. The digital media decoding method of claim 2 wherein the high arithmetic precision is 32-bit number processing, and the low arithmetic precision is 16-bit number processing.

4. The digital media decoding method of claim 2 further comprising:
   decoding blocks of transform coefficients from the compressed digital media bitstream;
   in the case that the syntax element signals use of the high arithmetic precision, applying an inverse transform to the transform coefficients using high arithmetic precision processing; and
   in the case that the syntax element signals use of the low arithmetic precision, applying an inverse transform to the transform coefficients using low arithmetic precision processing.

5. The digital media decoding method of claim 4 wherein the high arithmetic precision is 32-bit number processing, and the low arithmetic precision is 16-bit number processing.

6. The digital media decoding method of claim 2 further comprising:
   decoding blocks of transform coefficients from the compressed digital media bitstream;
   applying an inverse transform to the transform coefficients using high arithmetic precision processing regardless of the degree of arithmetic precision signaled via the syntax element.

7. The digital media decoding method of claim 1, wherein the degree of arithmetic precision describes the bit depth of the numbers used during transform computations.

8. A digital media encoding method comprising:
   receiving digital media data at a digital media encoder;
   making a decision whether to use lower precision arithmetic for transform computations during processing of the digital media data;
   representing the decision whether to use the lower precision arithmetic for transform computations with a syntax element in an encoded bitstream, wherein the syntax element is operable to communicate the decision to a digital media decoder; and
   outputting the encoded bitstream.

9. The digital media encoding method of claim 8 wherein said making a decision comprises:
   verifying whether the lower precision arithmetic for transform computations produces a same decoder output as using a higher precision arithmetic for transform computations; and
   deciding whether to use the lower precision arithmetic based upon said verifying.

10. The digital media encoding method of claim 8 wherein said lower precision arithmetic is a 16-bit arithmetic precision.

11. The digital media encoding method of claim 8 further comprising:
    making a decision whether to apply a scaling of the input digital media data prior to transform coding; and
    representing the decision whether to apply the scaling with a syntax element in the encoded bitstream.

12. The digital media encoding method of claim 11 wherein said making a decision whether to apply a scaling comprises deciding not to apply scaling of the input digital media data when losslessly encoding the digital media data.

13. The digital media encoding method of claim 8, wherein the lower precision arithmetic uses data values having fewer bits than data values used in a higher precision arithmetic.

14. A digital media decoding method comprising:
    receiving a compressed digital media bitstream at a digital media decoder;
    parsing a syntax element from the bitstream signaling a choice of precision modes for transform computations during processing of the digital media data;
    in the case that a first precision mode using scaling is signaled, scaling output of the decoder;
    in the case that a second precision mode without scaling is signaled, omitting to apply scaling of the output; and
    outputting a reconstructed image.

15. The digital media decoding method of claim 14 wherein said scaling output of the decoder comprises rounded division of the output by a number.

16. The digital media decoding method of claim 14 wherein said rounded division of the output is a rounded division by the number 8.

17. The digital media decoding method of claim 14 further comprising:
    parsing a second syntax element from the bitstream signaling whether to use a lower arithmetic precision for transform computations during processing of the digital media data;
    decoding blocks of transform coefficients from the compressed digital media bitstream; and in the case that the second precision mode without scaling and the use of lower arithmetic precision are signaled, performing inverse transform processing of the transform coefficients using the lower arithmetic precision.

18. The digital media decoding method of claim 17 wherein said lower arithmetic precision is a 16-bit arithmetic precision.

19. The digital media decoding method of claim 14 wherein the digital media data is encoding using a two stage transform structure having a first stage transform followed by a second stage transform on DC coefficients of the first stage transform, the digital media decoding method further comprising:
   decoding digital media data from the compressed digital media bitstream;
   applying an inverse second stage transform to the digital media data;
   applying an inverse first stage transform to the digital media data;
   performing color conversion of the digital media data; and
   wherein said scaling output of the decoder in the case that the first precision mode using scaling is signaled, comprises:
      left shifting the digital media data by a single bit before input to the inverse first stage transform; and
      right shifting the digital media data by three bits after the color conversion.

20. The digital media decoding method of claim 14 wherein said compressed digital media bitstream is encoded according to a syntax scheme defining separate primary image plane and alpha image plane for an image, the syntax element signaling choice of precision mode being signaled per image plane, whereby the precision mode of the primary image plane and the alpha image plane are independently signaled, and the decoding method comprises performing said actions of parsing the syntax element signaling choice of precision mode for each image plane, and in the case that the first precision mode using scaling is signaled for a respective image plane, scaling output of the decoder for the respective image plane.

21. A computer-readable storage device storing computer-executable instructions which when executed by a computer cause the computer to perform a method, the method comprising:
   receiving a compressed digital media bitstream at a digital media decoder;
   parsing a syntax element from the bitstream signaling a degree of arithmetic precision to use for transform computations during processing of the digital media data; and
   outputting a reconstructed image.

22. The computer-readable storage device of claim 21, wherein the syntax element signals to use one of a high arithmetic precision or a low arithmetic precision.

23. The computer-readable storage device of claim 22, wherein the method further comprises:
   decoding blocks of transform coefficients from the compressed digital media bitstream;
   in the case that the syntax element signals use of the high arithmetic precision, applying an inverse transform to the transform coefficients using high arithmetic precision processing; and
   in the case that the syntax element signals use of the low arithmetic precision, applying an inverse transform to the transform coefficients using low arithmetic precision processing.

24. The computer-readable storage device of claim 21, wherein the degree of arithmetic precision describes the bit depth of the numbers used during transform computations.

25. A computer-readable storage device storing computer-executable instructions which when executed by a computer cause the computer to perform a method, the method comprising:
   receiving digital media data at a digital media encoder;
   making a decision whether to use lower precision arithmetic for transform computations during processing of the digital media data;
   representing the decision whether to use the lower precision arithmetic for transform computations with a syntax element in an encoded bitstream, wherein the syntax element is operable to communicate the decision to a digital media decoder; and
   outputting the encoded bitstream.

26. The computer-readable storage device of claim 25, wherein said making a decision comprises:
   verifying whether the lower precision arithmetic for transform computations produces a same decoder output as using a higher precision arithmetic for transform computations; and
   deciding whether to use the lower precision arithmetic based upon said verifying.

27. The computer-readable storage device of claim 25, wherein the method further comprises:
   making a decision whether to apply a scaling of the input digital media data prior to transform coding; and
   representing the decision whether to apply the scaling with a syntax element in the encoded bitstream.

28. The computer-readable storage device of claim 25, wherein the lower precision arithmetic uses data values having fewer bits than data values used in a higher precision arithmetic.

29. A computer-readable storage device storing computer-executable instructions which when executed by a computer cause the computer to perform a method, the method comprising:
   receiving a compressed digital media bitstream at a digital media decoder;
   parsing a syntax element from the compressed digital media bitstream signaling a choice of precision modes for transform computations during processing of digital media data from the compressed digital media bitstream;
   reconstructing an image from the digital media data, including:
      in the case that a first precision mode using scaling is signaled, scaling output of the decoder;
      in the case that a second precision mode without scaling is signaled, omitting to apply scaling of the output; and
   outputting the reconstructed image.

30. The computer-readable storage device of claim 29, wherein the method further comprises:
   parsing a second syntax element from the compressed digital media bitstream signaling whether to use a lower arithmetic precision for transform computations during processing of the digital media data;
   as part of the reconstructing:
      decoding blocks of transform coefficients from the compressed digital media bitstream; and
      in the case that the second precision mode without scaling and the use of lower arithmetic precision are signaled, performing inverse transform processing of the transform coefficients using the lower arithmetic precision.

* * * * *